United States Patent
Shin

(10) Patent No.: US 7,913,285 B2
(45) Date of Patent: Mar. 22, 2011

(54) APPARATUS AND METHOD FOR INTERFACING BETWEEN SET-TOP BOX AND POINT OF DEPLOYMENT FOR PAY-PER-VIEW SERVICE

(75) Inventor: Jae-Jin Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1351 days.

(21) Appl. No.: 11/315,179

(22) Filed: Dec. 23, 2005

(65) Prior Publication Data

US 2006/0184971 A1    Aug. 17, 2006

(30) Foreign Application Priority Data

Feb. 11, 2005   (KR) .................. 10-2005-0011618

(51) Int. Cl.
*H04N 7/173* (2006.01)
(52) U.S. Cl. ................ 725/131; 725/1; 725/60; 725/61; 725/100; 725/104
(58) Field of Classification Search ............ 725/60, 725/61, 100, 131, 1, 104
See application file for complete search history.

(56) References Cited

U.S. PATENT DOCUMENTS

| | | | |
|---|---|---|---|
| 5,778,181 A * | 7/1998 | Hidary et al. ................ | 725/110 |
| 7,047,196 B2 * | 5/2006 | Calderone et al. ......... | 704/270.1 |
| 2004/0031055 A1 * | 2/2004 | Jung et al. .................... | 725/104 |
| 2004/0261126 A1 * | 12/2004 | Addington et al. ........... | 725/135 |
| 2005/0015814 A1 * | 1/2005 | Yun .............................. | 725/132 |
| 2007/0006252 A1 | 1/2007 | Yun | |

FOREIGN PATENT DOCUMENTS

KR   10-2001-0073305   8/2001

* cited by examiner

*Primary Examiner* — Joseph P Hirl
*Assistant Examiner* — Jivka Rabovianski
(74) *Attorney, Agent, or Firm* — H.C. Park & Associates, PLC

(57) ABSTRACT

A method for providing pay-per-view service while observing an OpenCable standard in realization of bi-directional digital cable broadcasting includes a method for interfacing between a set-top box and a point of deployment (POD), the method comprising the steps of: receiving, at the set-top box, an arbitrary program event purchase-related instruction inputted by a user, generating an object based on the arbitrary program event purchase-related instruction, and transmitting the arbitrary program event purchase-related instruction object to the POD; and receiving, at the POD, the object transmitted by the set-top box, generating an answer object based on the reception, and transmitting the answer object to the set-top box.

20 Claims, 5 Drawing Sheets

FIG. 2

```
Purchase_inq(){
    Tag              16 bits uimsbf 0x0001
    Length           16 bits uimsbf 0x0006
    Event_Id         16bits uimsbf
    Num_delay        16bits uimsbf
}
```

```
Purchase_ans(){
    Tag              16 bits uimsbf 0x0002
    Length           16bits uimsbf 0x0008
    Event_Id         16bits uimsbf
    Purchase_status  16bits uimsbf
    Price            16bits uimsbf
}
```

FIG. 4

```
Cancel_req(){
    Tag         16 bits uimsbf 0x0007
    Length      16 bits uimsbf 0x0006
    Event_Id    16bits uimsbf
    Num_delay   16bits uimsbf
}
```
41

```
Cancel_cnf(){
    Tag         16 bits uimsbf 0x0008
    Length      16 bits uimsbf 0x0006
    Event_Id    16bits uimsbf
    Success     16bits uimsbf
}
```
42

FIG. 5

```
Phone_inq(){
        Tag          16 bits uimsbf 0x0005
        Length       16 bits uimsbf 0x0000
}
```
51

```
Phone_ans(){
        Tag          16 bits uimsbf 0x0006
        Length       16 bits uimsbf
        for (i=0;i<Length, i++)
        {
        Cphone 8bits   uimsbf
        }
}
```
52

APPARATUS AND METHOD FOR INTERFACING BETWEEN SET-TOP BOX AND POINT OF DEPLOYMENT FOR PAY-PER-VIEW SERVICE

CLAIM OF PRIORITY

This application makes reference to, incorporates the same herein, and claims all benefits accruing under 35 U.S.C. §119 from an application for APPARATUS AND METHOD FOR INTERFACING BETWEEN SET-TOP BOX AND POINT OF DEPLOYMENT FOR PAY-PER-VIEW SERVICE earlier filed in the Korean Intellectual Property Office on Feb. 11, 2005 and there duly assigned Ser. No. 2005-11618.

BACKGROUND OF THE INVENTION

1. Technical Field

The present invention relates generally to a method of realizing digital broadcasting service and, more particularly to an apparatus and method of interfacing a set-top box and a point of deployment (POD) for pay-per-view service, in which the pay-per-view service is provided while observing an OpenCable standard in realization of bi-directional digital cable broadcasting.

2. Related Art

Digital broadcasting may be classified into digital terrestrial broadcasting, digital satellite broadcasting and cable broadcasting according to the transmission medium. Currently, digital satellite broadcasting is activated all over the world, and digital terrestrial broadcasting is in progress in some countries, such as the United States of America and Europe.

Digital broadcasting compresses information of channel-specific programs on the basis of an MPEG (Moving Picture Experts Group) coding standard or the like with high efficiency, and multiplexes and transmits the programs corresponding to the plurality of channels on the basis of transmission medium-specific digital modulation modes. Thus, digital broadcasting can broadcast tens to hundreds of channels without using numerous repeaters as in analog broadcasting.

In general, a broadcasting system for processing the cable digital broadcasting includes a head end which transmits broadcasting related digital signals and receives and processes data uploaded from subscribers, and a set-top box which receives digital signals transmitted from the head end, converts the received digital signals into analog signals, and reproduces the converted analog signals into original audio and video signals.

The head end refers to a main control center equipped with technical equipment which receives, produces and retransmits the programs from a satellite or other location through a system network in a cable television (TV) system. The set-top box is generally a home communication terminal required to use multimedia communication service inclusive of video-on-demand service.

With this broadcasting system, each cable system operator (SO) produces programs, content, and other data of cable TVs, or is supplied with them from producers, and transmits them to the subscribers. Then, each subscriber looks at the programs or other data transmitted from the cable SOs so as to watch the broadcasting which he/she wants to watch.

With respect to video and audio compression technology in the cable digital broadcasting, MPEG-2 is adopted all over the world as a standard. Its modulation mode is a QAM (Quadrature Amplitude Modulation) mode, which is one of the digital modulation modes which varies amplitude and phase according to a digital data signal to be transmitted, and which is more suitable for transmission of high-efficient data within a limited transmission band. In particular, 64 QAM digital frequency modulation technology is mainly used to transmit downstream data transmission in a coaxial cable network, and supports a transfer rate of up to a maximum of 28 Mbps on a single 6 MHZ channel.

Most technology used for cable broadcasting is used in the digital TV, and has a difference in that the digital TV technology makes use of the transmission medium called wireless, while the cable TV broadcasting makes use of the transmission medium called wire. Therefore, cable broadcasting has an advantage in that it is still excellent in providing bi-directional service compared with terrestrial broadcasting.

The set-top box (digital broadcasting receiver) in digital broadcasting is mainly directed to decoding digitized broadcasting and managing information transmitted by the head end which is installed at a local cable TV company for the cable TV or cable modem service which is provided to the subscribers, and transmitting analog signals to the TV. The set-top box receives broadcasting and managing information from the head end, such as an audio/video server, a service information server transmitting broadcasting channel information, and a conditional access server.

In this digital cable broadcasting, bi-directional service has recently made an appearance. The concept of "bi-directional" means that, when the desires of a user are transmitted to the multimedia, the information desired by the user is provided. New media may be media intended to technologically reproduce a bidirectional function which has been lost. This means that the user has a bi-directional function and a network application function. Accordingly, this means that the user can edit and process a variety of data that he/she has.

A field in which the bi-directional system is best applied commercially is the operation of pay-per-view. Up to now, the subscriber applies a specific program to the cable system. However, in a new bi-directional converter system, it is possible to select the program by simply pushing a button on a remote controller. A computer at the head end automatically and immediately processes, controls and manages this program application of the subscriber.

In order for the pay-per-view system to be applied to digital cable broadcasting, it is necessary to adjust watching authorization according to the subscriber. It is a so-called CA (conditional access) system that takes charge of this role. The CA system performs a combination of scrambling and encryption functions, wherein scrambling serves to prevent any unauthorized person from seeing a signal, is transmitted together with any scrambled signal, and then is used together with a secret key that serve to descramble the scrambled signal. It is encryption that serves to protect the secret key at this time.

The CA system may be built into the set-top box, but it is located at a POD (Point of Deployment) that is a separate device independent of the set-top box.

The POD is a conditional access card (so-called cable TV card) that contains information on the subscribers of cable TV so as to permit paid broadcasting of the cable TV to be watched only when being identified as the subscriber. The POD is composed of a PCMCIA card together with a smart card containing the subscriber information, and it is issued to the subscriber by a cable TV broadcaster, and is inserted into and used in the set-top box. The POD permits only qualified or authorized pay subscribers to decode the encrypted signal so as to watch cable TV. In addition, the POD makes it possible to perform the function of billing of pay service by transmitting billing and subscriber managing information to the head end of the cable SO. This mode, wherein the cable TV card is separated from the set-top box, is called "Open-Cable."

A key element of the OpenCable service is mandatory use of the POD. In other words, the POD is a device having a conditional access system (CAS) and copy protection taking a type of the smart card enabling the cable TV service provider to identify the subscriber and use type, and is premised on a type being separated from the set-top box.

The set-top box for existing pay-per-view service, as described above, is not applied to the OpenCable standard because it has the built-in CA system. In addition, specific protocols related to the set-top box for the pay-per-view service are different according to a CA system manufacturer, or are not opened due to security, and thus are not standardized.

This problem gives rise to a result that interfacing protocols between the set-top box for the pay-per-view service and the POD are not harmonized under the OpenCable standard adopted as the internal digital broadcasting. Thus, any need to solve this problem is raised.

SUMMARY OF THE INVENTION

It is, therefore, an objective of the present invention to provide an apparatus and method for interfacing between a set-top box and a point of deployment (POD) for pay-per-view service, capable of being provided in a different scheme according to a digital cable broadcaster, and being universally used according to an OpenCable standard.

In order to accomplish the objective, according to an aspect of the present invention, a method for interfacing between a set-top box and a point of deployment (POD) comprises the steps of: receiving, by means of the set-top box, an arbitrary program event purchase-related instruction inputted from a user, generating an object based on the purchase-related instruction, and transmitting the purchase-related instruction object to the POD; and receiving, by means of the POD, the object transmitted from the set-top box, generating an answer object based on the reception, and transmitting the answer object to the set-top box.

In the latter regard, the purchase-related instruction object may include at least one of: a purchasable inquiry object, inquiring as to whether or not a program that is recently tuned can be purchased; a purchase request object, requesting purchase of a program that is recently tuned; a purchase cancellation request object, requesting cancellation of a purchase of the program that has been already requested for purchase; and a phone service inquiry object, requesting service of a phone number of a local call center which the POD recognizes.

Furthermore, the answer object may include at least one of: a purchasable inquiry answer object, responding to the purchasable inquiry which the set-top box has generated; a purchase request answer object, responding to a purchase request which the set-top box has generated; a purchase cancellation answer object, responding to a purchase cancellation request which the set-top box has sent; and a phone service inquiry answer object, responding to a phone service inquiry which the set-top box has sent.

Furthermore, the purchasable inquiry object may include at least one of information on a program event identification (ID) and information on the number of events between current events and requested events.

In addition, the purchasable inquiry answer object may include at least one of 1 information on the price of a corresponding program event and information on the purchase status of the requested program event.

Furthermore, the purchase request object may include at least one of information on a program event identification (ID) and information on the number of events between current events and requested events.

In addition, the purchase request answer object may include at least one of information on success in purchase and information on a purchase denial code.

Furthermore, the purchase cancellation request object may include at least one of information on a program event identification (ID) and information on the number of events between current events and requested events.

In addition, the purchase cancellation request answer object may include information as to success in cancelling a purchase.

Furthermore, the phone service inquiry answer object includes information on a serviced phone number of a local call center, and information on a length of the serviced phone number.

According to another aspect of the present invention, a digital cable broadcasting system comprises: a set-top box for receiving an arbitrary program event purchase-related instruction inputted from a user, and for generating and transmitting an object based on the purchase-related instruction; and a point of deployment (POD) for receiving the object transmitted by the set-top box, generating an answer object based on the reception, and transmitting the answer object to the set-top box.

In this regard, the purchase-related instruction object may include at least one of: a purchasable inquiry object, inquiring as to whether or not a program that is recently tuned can be purchased; a purchase request object, requesting purchase of a program that is recently tuned; a purchase cancellation request object, requesting cancellation of purchase of the program that has been already requested for purchase; and a phone service inquiry object, requesting service of a phone number of a local call center which the POD recognizes.

Furthermore, the answer object may include at least one of: a purchasable inquiry answer object, responding to a purchase inquiry which the set-top box has made; a purchase request answer object, responding to a purchase request which the set-top box has sent; a purchase cancel answer object, responding to a purchase cancellation which the set-top box has requested; and a phone service inquiry answer object, responding to a phone service inquiry which the set-top box has made.

According to yet another aspect of the present invention, a set-top box of a digital broadcasting system receives an arbitrary program event purchase-related instruction inputted from a user, and generates, on the basis of the purchase-related instruction, at least one of a purchasable inquiry object inquiring as to whether or not a program that is recently tuned can be purchased, a purchase request object requesting purchase of a program that is recently tuned, a purchase cancellation request object requesting cancellation of purchase of a program that has been already requested for purchase, and a phone service inquiry object requesting service of a phone number of a local call center which a point of deployment (POD) recognizes, and transmitting the generated object to the POD.

According to yet still another aspect of the present invention, a point of deployment (POD) of a digital broadcasting system generates at least one of a purchasable inquiry answer object corresponding to a purchase inquiry, a purchase request answer object corresponding to a purchase request, a purchase cancellation answer object corresponding to a purchase cancellation request, and a phone service inquiry answer object corresponding to a phone service inquiry on the basis of a purchase-related request of a pay-per-view or pay-per-day event which a set-top box transmits, and transmitting the generated object to the set-top box.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 2 shows a method for interfacing between a host and a POD on inquiring as to whether a program which is currently tuned can be purchased, in accordance with one exemplary embodiment of the present invention;

FIG. 4 shows a method for interfacing between a host and a POD on canceling the purchase of a program which has been already purchased in accordance with an exemplary embodiment of the present invention; and FIG. 5 shows a method for interfacing between a host and a POD on requesting the phone number of a local call center which the POD recognizes at present in accordance with one exemplary embodiment of the present invention.

DETAILED DESCRIPTION OF THE INVENTION

Hereinafter, exemplary embodiments of the present invention are described in detail with reference to the accompanying drawings.

Figure 1:
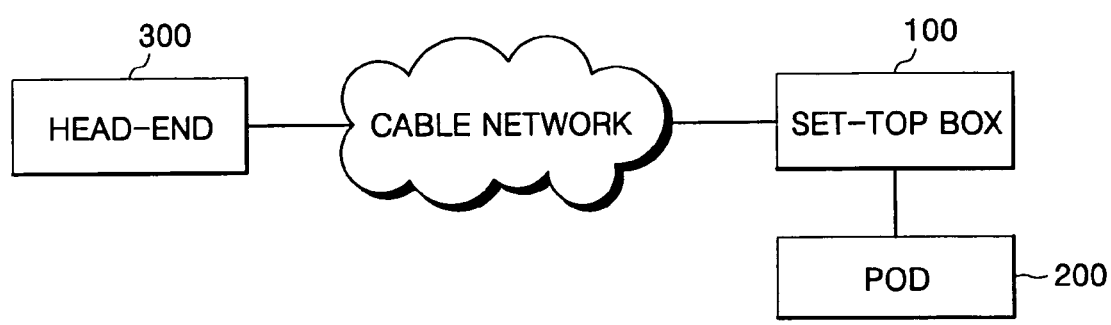
FIG. 1 shows the configuration of a cable network to which the present invention is applied.

FIG. 1 shows the configuration of a cable network to which the present invention is applied.

A set-top box 100 communicates with a head end 300 which is located at a broadcasting station in a cable network. The set-top box 100 is located on the premises of a cable broadcasting subscriber, together with a point of deployment (POD) 200.

The head end 300 generates a program encrypted in a cable broadcasting signal, and transmits the program to a subscriber. The set-top box 100 receives the program through the cable network. The set-top box 100 filters the received signal, and transmits a stream to the POD 200. The POD 200 permits the stream to be decrypted, and transmits the decrypted stream to the set-top box 100. Finally, the set-top box 100 reproduces the decrypted stream.

The present invention is mainly directed to a method for interfacing between the set-top box 100 and the POD 200. Above all, an interface which supports pay-per-view and makes it possible is defined.

Exemplary embodiments according to the present invention are generally categorized into several types. Among them, the first embodiment is directed to a method by which a user checks as to whether a program which is currently tuned can be purchased.

FIG. 2 shows a method for interfacing between a host and a POD on inquiring as to whether a program which is currently tuned can be purchased, in accordance with one exemplary embodiment of the present invention.

When a user wants to purchase a program which is currently tuned through a television (TV) and shown on a TV screen, he/she must inquire as to whether the program can be purchased. If the user makes an inquiry as to whether the program can be purchased through a set-top box or TV, the set-top box transmits a message corresponding to the request to a POD.

At this point, at the set-top box, with regard to a request to purchase a pay-per-view (PPV) or pay-per-day (PPD) event which the user selects, it is determined whether the selected event has been already requested for purchase before a window for the purchase is displayed. To this end, an electronic program guide (EPG) application transmits to the POD 200 a purchasable inquiry object 21, inquiring as to whether the corresponding event can be purchased.

In this regard, the purchasable inquiry object 21, which is transmitted to the POD 200, has a format of "Purchase_inq" shown in FIG. 2.

With respect to the content of the purchasable inquiry object, "Event_ID" is to be borrowed from AEIT (Aggregate Event Information Table) related to the PPV event, and "Num_delay" stands for the number of events between current events and requested events. Specifically, when "Num_delay" is 0, this denotes a current event, when "Num_delay" is 1, this denotes a next event, and, when "Num_delay" is 2, this denotes a next-next event.

The POD 200 receiving the purchasable inquiry object 21 generates a purchasable inquiry answer object 22 so as to respond to the purchase inquiry which the set-top box has made. The purchasable inquiry answer object 22 has the format of "Purchase_ans" shown in the lower part of FIG. 2.

With respect to the content of the purchasable inquiry answer object 22, "Price" is denoted by a specific currency, for example, Won (Korean currency), and "Purchase_status" indicates that the requested event can be purchased. For example, when its value is 0, the event can be purchased, and when its value is 1, the event cannot be purchased.

The method for interfacing between the POD and the set-top box in accordance with a second embodiment of the present invention is a method for purchasing a program which is currently tuned.

Figure 3:
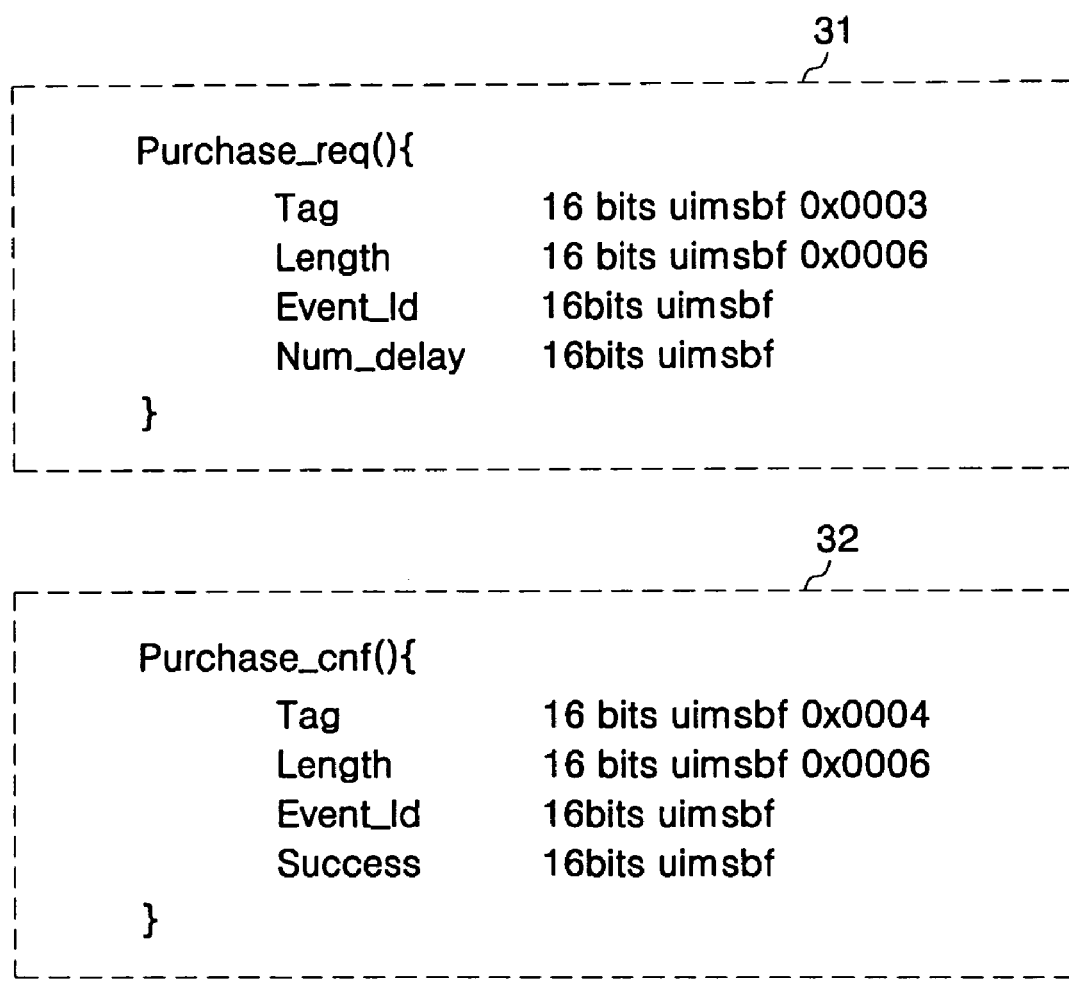
FIG. 3 shows a method for interfacing between a host and a POD on purchasing a program which is currently tuned in accordance with an exemplary embodiment of the present invention.

FIG. 3 shows a method for interfacing between a host and a POD on purchasing a program which is currently tuned in accordance with one exemplary embodiment of the present invention. When a user requests purchase of a specific PPV or PPD event by means of a proper purchase PIN (Personal Identification Number) on a set-top box 100, an EPG application of the set-top box transmits a purchase request object 31 to a POD 200. The purchase request object 31, expressed by "Purchase_req", has contents given in the upper portion of FIG. 3.

The POD 200 receiving the purchase request object 31 stores purchase-related interaction. When the corresponding purchase is successful, the POD notifies the set-top box 100 of that fact. To this end, a purchase response object is used, the format of which is shown in the lower portion of FIG. 3.

In the case of a successful purchase success, a value of "Success" is set to 0. However, in the case of a purchase denial, the value is set to a value other than 0. In the case of purchase denial, the value of "Success" denotes a purchase denial code. For example, in the not-purchasable case, the value of "Success" may be set to 1.

A third embodiment of the invention is directed to a method for canceling the purchase of a program which has already been purchased.

FIG. 4 shows a method for interfacing between a host and a POD on canceling the purchase of a program which has been already purchased in accordance with an exemplary embodiment of the present invention.

When a user makes a request to cancel a PPV or PPD event which has been already purchased by means of a proper purchase PIN on a set-top box 100, an EPG application of the set-top box 100 transmits a purchase cancellation request object 41 to a POD 200. The purchase cancellation request object 41, expressed by "Cancel_req", has the contents shown in the upper portion of FIG. 4.

When the POD 200 receives the purchase cancellation request object 41, it stores a purchase interaction. Furthermore, the POD 200 transmits a purchase cancellation answer object 42, as expressed by "Cancel_conf," containing information on whether or not the cancellation is successful to the set-top box 100.

A fourth embodiment of the invention is directed to a method for requesting the phone number of a local call center which a POD recognizes at present.

FIG. 5 shows a method for interfacing between a host and a POD on requesting the phone number of a local call center which the POD recognizes at present in accordance with an exemplary embodiment of the present invention.

When a user requests a phone number of a local call center through a set-top box 100, a phone service inquiry object 51, as expressed by "Phone_inq," shown in the upper portion of FIG. 5, is transmitted to a POD 200. The POD 200 receiving the phone service inquiry object 51 transmits a phone service inquiry answer object 52, expressed by "Phone_ans", to the set-top box 100. The phone service inquiry object 51 and the phone service inquiry answer object 52 have the contents shown in FIG. 5. With respect to the contents of the phone service inquiry answer object 52, "Length" denotes the length of the phone number, and information contained in "Cphone" indicates the phone number of the call center in the format of an ASCII code.

An interfacing operation between the set-top box 100 and the POD 200 includes a method for deleting a purchase secret number and an adult verification number which are stored in the set-top box 100 inclusive of the above-mentioned operations. The method for deleting the purchase secret number and the adult verification number is supported in the existing OpenCable standard, and so it is sufficient to observe the standard.

According to the present invention, the pay-per-view service can be applied to any CA system or POD on the basis of the OpenCable standard adopted as the digital cable broadcasting standard, for example, in Korea. Thus, it has the advantages of providing a protocol that can be universally used, and of making the pay-per-view service possible in a very simple manner.

Although exemplary embodiments of the present invention have been described, it will be understood by those skilled in the art that the present invention should not be limited to the described exemplary embodiments. Rather, various changes and modifications can be made within the spirit and scope of the present invention, as defined by the following claims.

What is claimed is:

1. A method for interfacing between a set-top box and a point of deployment (POD), the method comprising:

receiving, at the set-top box, an arbitrary program event purchase-related instruction inputted by a user, generating a purchase-related instruction object, and transmitting the purchase-related instruction object to the POD, said purchase-related instruction object comprising a purchasable inquiry object in response to a first input arbitrary program event purchase-related instruction, a purchase request object in response to a second input arbitrary program event purchase-related instruction, a purchase cancellation request object in response to a third input arbitrary program event purchase-related instruction, and a phone service inquiry object in response to a fourth input arbitrary program event purchase-related instruction; and receiving, at the POD, the purchase-related instruction object transmitted by the set-top box, generating an answer object based on the received purchase-related instruction object, and transmitting the answer object to the set-top box.

2. The method of claim 1, wherein said purchasable inquiry object inquiring as to whether a program that is recently tuned can be purchased;

said purchase request object requesting purchase of the program that is recently tuned;

said purchase cancellation request object requesting cancellation of the purchase of a program that has been requested for purchase; and said phone service inquiry object requesting service of a phone number of a local call center which the POD recognizes.

3. The method of claim 2, wherein the purchasable inquiry object comprises at least one of information as to a program event identification (ID) and information as to a number of events between current events and requested events.

4. The method of claim 2, wherein the purchase request object comprises at least one of information as to a program event identification (ID) and information as to a number of events between current events and requested events.

5. The method of claim 2, wherein the purchase cancellation request object comprises at least one of information as to a program event identification (ID) and information as to a number of events between current events and requested events.

6. The method of claim 2, wherein the phone service inquiry answer object comprises information as to a serviced phone number of a local call center and information as to a length of the serviced phone number.

7. The method of claim 6, wherein the serviced phone number of the local call center is in a form of ASCII code.

8. The method of claim 2, wherein the purchasable inquiry object, the purchase request object, and the purchase cancellation request object each comprise tag information, length information, information as to a program event identification (ID), and information as to a number of events between current events and requested events.

9. The method of claim 1, wherein the answer object comprises at least one of:

a purchasable inquiry answer object responding to a purchasable inquiry which the set- top box transmits;

a purchase request answer object responding to a purchase request which the set-top box transmits;

a purchase cancellation answer object responding to a purchase cancellation request which the set-top box transmits; and a phone service inquiry answer object responding to a phone service inquiry which the set-top box transmits.

10. The method of claim 9, wherein the purchasable inquiry answer object comprises at least one of information as to a price of a corresponding program event and information as to a purchase status of a requested program event.

11. The method of claim 8, wherein the purchase request answer object comprises at least one of information as to success in purchase and information as to a purchase denial code.

12. The method of claim 9, wherein the purchase cancellation answer object comprises information as to success in purchase cancellation.

13. A digital cable broadcasting system, comprising:
a set-top box configured to receive an arbitrary program event purchase-related instruction inputted by a user, and to generate and transmit a purchase-related instruction object, said purchase-related instruction object comprising a purchasable inquiry object in response to a first input arbitrary program event purchase-related instruction, a purchase request object in response to a second input arbitrary program event purchase-related instruction, a purchase cancellation request object in response to a third input arbitrary program event purchase-related instruction, and a phone service inquiry object in response to a fourth input arbitrary program event purchase-related instruction; and
a point of deployment (POD) configured to receive the purchase-related instruction object transmitted by the set-top box, to generate an answer object based on the received purchase-related instruction object, and to transmit the answer object to the set-top box.

14. The digital cable broadcasting system of claim 13, wherein
said purchasable inquiry object to inquire as to whether a program that is recently tuned can be purchased;
said purchase request object to request purchase of the program that is recently tuned;
said purchase cancellation request object to request cancellation of purchase of a program that has been requested for purchase; and
said phone service inquiry object to request service of a phone number of a local call center which the POD recognizes.

15. The digital cable broadcasting system of claim 14, wherein the purchasable inquiry object, the purchase request object, and the purchase cancellation request object each comprise tag information, length information, information as to a program event identification (ID), and information as to a number of events between current events and requested events.

16. The digital cable broadcasting system of claim 13, wherein the answer object comprises at least one of:
a purchasable inquiry answer object to respond to a purchase inquiry which the set-top box generates;
a purchase request answer object to respond to a purchase request which the set-top box generates;
a purchase cancellation answer object to respond to a purchase cancellation which the set-top box generates; and
a phone service inquiry answer object to respond to a phone service inquiry which the set-top box generates.

17. A set-top box of a digital broadcasting system, the set-top box configured to receive an arbitrary program event purchase-related instruction inputted by a user, and to generate, on the basis of the arbitrary program event purchase-related instruction, all of a purchasable inquiry object to inquire as to whether a program that is recently tuned can be purchased, a purchase request object to request purchase of the program that is recently tuned, a purchase cancellation request object to request cancellation of purchase of the program that has been already requested for purchase, and a phone service inquiry object to request service of a phone number of a local call center which a point of deployment (POD) recognizes, and to transmit the generated object to the POD.

18. The set-top box of claim 17, wherein the purchasable inquiry object, the purchase request object, and the purchase cancellation request object each comprise tag information, length information, information as to a program event identification (ID), and information as to a number of events between current events and requested events.

19. A point of deployment (POD) of a digital broadcasting system, the POD configured to generate all of a purchasable inquiry answer object corresponding to a purchase inquiry, a purchase request answer object corresponding to a purchase request, a purchase cancellation answer object corresponding to a purchase cancellation request, and a phone service inquiry answer object corresponding to a phone service inquiry on the basis of a purchase-related request of one of a pay-per-view and a pay-per-day event which a set-top box transmits, and to transmit the generated object to the set-top box.

20. The POD of claim 19, wherein:
the purchasable inquiry answer object comprises tag information, length information, information as to a program event identification (ID), purchase status information, and purchase price information,
the purchase request answer object comprises tag information, length information, information as to a program event ID, and success information indicating whether the purchase request was successful, and
the purchase cancellation answer object comprises tag information, length information, information as to a program event ID, and success information indicating whether the purchase cancellation was successful.

* * * * *